United States Patent [19]

Maske

[11] 4,041,234
[45] Aug. 9, 1977

[54] DISPERSIBLE GLYOXAL-XANTHAN GUM COMPLEXES

[75] Inventor: Fred J. Maske, St. Paul, Minn.

[73] Assignee: General Mills Chemicals, Inc., Minneapolis, Minn.

[21] Appl. No.: 716,630

[22] Filed: Aug. 23, 1976

[51] Int. Cl.² .............................................. C08B 37/00
[52] U.S. Cl. .................................................... 536/114
[58] Field of Search ....................... 536/114; 424/180

[56] References Cited

U.S. PATENT DOCUMENTS 3,236,831   2/1966   Schweiger ........................... 536/114

Primary Examiner—Lewis Gotts
Assistant Examiner—Cary Owens
Attorney, Agent, or Firm—Gene O. Enockson; Patrick J. Span; Elizabeth Tweedy

[57] ABSTRACT

Hand-dispersible xanthomonas gum-glyoxal complexes.

1 Claim, No Drawings

DISPERSIBLE GLYOXAL-XANTHAN GUM COMPLEXES

This invention relates to xanthomonas gum-glyoxal complexes and methods of preparing same. More particularly, this invention relates to xanthomonas gum-glyoxal complexes which are dispersible by hand stirring in water or brine and which, in some instances, develop higher viscosities than xanthomonas gum develops alone.

In addition to improved dispersibility and higher viscosities, the complexes of this invention exhibit hydration rates which are slower than xanthomonas gum itself and can be varied by the adjustment of the glyoxal level.

BACKGROUND OF THE INVENTION

Xanthomonas gum is an excellent and widely used suspending and viscosity building agent. Some of its particular uses are in oil well fluids, paint, sprays and cleaning fluids. Xanthomonas gum however has a few disadvantages. It is very difficult to disperse and wet in water or brine so that hydration can take place. A high degree of shear is usually necessary to wet each gum particle. Once dispersal and wetting are accomplished the hydration of the gum, as evidenced by the development of viscosity, is quite rapid.

Glyoxal has been complexed with guar for the purpose or improving dispersion. Xanthomonas gum and guar exhibit very different rheological characteristics, have different molecular configurations and are obtained from entirely different sources. Guar is obtained from the endosperm of the guar bean while xanthomonas gum is produced through fermentation by the *Xanthomonas campestris* bacteria.

Glyoxal and guar only react at a pH level of 6.4 or less. Glyoxal and Xanthomonas gum will react at a pH level of about 8.0 or less. An addition of an acid is not necessary to achieve a glyoxal complex with xanthomonas gum whereas it is necessary for successful complexing of glyoxal with guar.

SUMMARY OF THE INVENTION

It has been found that xanthomonas gum-glyoxal complexes exhibit improved dispersion and wetting properties over xanthomonas gum. In addition, in many instances the complexes exhibit higher ultimate viscosities than exhibited by the original xanthomonas gum alone. The hydration rate of the complex is generally slower than the hydration rate of xanthomonas gum alone, thus permitting more time for handling or adding materials. The hydration rate of the complexes can be tailored to a particular application by adjusting the glyoxal level in the xanthomonas gum.

The complexes preferably contain from about 0.02% to 5% by weight glyoxal based upon the weight of dry xanthomonas gum. Dispersion by hand mixing is usually accomplished in fresh complexes at about 0.02% to 0.10% glyoxal by weight of the xanthomonas gum. Upon prolonged storage, the complexes containing low levels of glyoxal lose their ability to readily disperse. Therefore, when prolonged storage is contemplated the higher levels of glyoxal are preferred. The greater the amount of glyoxal incorporated into the complex the slower becomes the hydration rate. This is beneficial when slow hydration rates are desired.

The complex can be formed by reacting the xanthomonas gum with the glyoxal at any time after the fermentation of the xanthomonas gum is complete. The reaction between the xanthomonas gum and the glyoxal can be carried out in the broth prior to precipitating the gum from the broth by adding glyoxal to the broth prior to adding a precipitating agent. The glyoxal can also be added to the broth after the precipitating agent has been added. The reaction can also be carried out by several methods after the gum has been precipitated from the broth and dried. One method of reacting the two components is by dispersing dry xanthomonas gum in an alcohol and water mixture, adding a specified amount of glyoxal to the mixture, mixing for a short period, then filtering and drying the filter cake. The resulting dried powder is dispersible and hydrates in water or aqueous salt solutions. Another method of preparation is mulling the xanthomonas gum and glyoxal in a mortar with enough water to effect reaction. This product is also dispersible and hydrates in water and sodium chloride solutions. The mulling process can be adapted for industrial use by tumbling the xanthomonas gum in a turbulizer and spraying an aqueous solution of glyoxal onto the tumbling xanthomonas gum particles. The particles are then dried.

When a vacuum is applied, the particles of a complex can be dried at room temperature, otherwise, the particles of a complex can be flash dried or oven dried. The extent of heat exposure should not exceed that represented by heating at a temperature of about 120° C for a period of about two hours. Optimum results were obtained when the final drying was conducted at temperatures between about 90° C to 110° C.

DETAILS OF THE INVENTION

Xanthomonas gum is a fermentation product produced by the action of the bacteria *Xanthomonas campestris* upon carbohydrates. Carbohydrates useful in the reaction include simple sugars, such as glucose and fructose, sucrose, starch and starch hydrolyzates. The reaction is carried out in the presence of selected minerals including phosphate and magnesium ions and a nitrogen source, usually a protein. The reaction is conducted in a pH range of from 6.5 to 7.5, preferably 7, and in a temperature range of from 28° to 30° C. Preferably the pH of the broth is controlled by metering into the mixture either an acid or base as required. In general, the commercial process involves growing the bacteria, inoculating a small batch of fermentable broth with the bacteria, allowing the small batch to ferment, inoculating a large batch of fermentable broth with the previously fermented small batch of broth, allowing the large batch to ferment, sterilizing the broth and finally recovering the xanthomonas gum from the broth.

The fermentation has been carried out by the following typical procedure. In the first step the bacteria was grown on an agar slant. In the second step bacteria from the slant was used to inoculate 2 liter aliquots of a fermentable broth containing per liter: glucose, 20 grams; $Na_2HPO_4.7H_2O$, 1.24 grams; $MgSO_4.7H_2O$, 0.25 grams; distillers dry solids, 8 grams. This second step broth was incubated for a period of 31 hours at a temperature of about 28° to 30° C. In the third step the broth was used to inoculate a 15 liter batch containing the same broth composition. The broth of the third step was allowed to ferment for a period of 29 hours at a temperature of about 28° to 30° C. The broth from the third step was used to inoculate a 15,000 liter batch of broth having the composition per liter of broth of: sucrose, 20 grams; cooked soy meal dispersion, 6 grams; rapeseed oil, 0.65 gram; sulfuric acid, 0.53 gram; MgSO$_4$.7H O, 0.25 gram; Na$_2$HPO$_4$.12H$_2$O, 15 grams and tap water. The final batch was allowed to ferment for a period of about 72 hours at a temperature of about 28° to 30° C. At the end of the final fermentation period the broth was steam sterilized to destroy all the viable microorganisms. The pH of the broth was then adjusted to 7.9 by the addition of potassium hydroxide and the gum was recovered from the broth.

In the above fermentation procedure a phosphate ion is essential for the growth of the bacteria. The phosphate ions act as buffers; and, when the broth is later made alkaline, their presence in large amounts may necessitate adding impractical amounts of alkali. Different magnesium salts can be used. Xanthomonas gum contains glucuronic acid groups and when the gum is made as described above, one-half to three-fourths of these groups are neutralized with sodium ions and the remainder with potassium ions. When potassium salts rather than sodium salts are used in the preparation of the gum, this ratio is reversed. Other modifications such as using different nitrogen sources, different selection of potassium and sodium ions, and different acids can be made. In general, such modifications will be within +5 percent of the above amount of the critical ingredients.

Once formed, the broth contains gum, residues of the chemicals, unconverted sugars, cell walls of the xanthomonas bacteria. The gum can be separated from the broth by precipitation with an alcohol usually isopropyl alcohol or a calcium ion at an alkaline pH. The precipitate is then separated from the remaining broth generally by centrifuging, washed with alcohol and dried.

The fermentation or precipitation process is not part of the present invention.

As noted above, the reaction between the xanthomonas gum and glyoxal can be carried out at any point after the fermentation is complete and the pH of the mixture is about 8 or below. When the gum has been precipitated with a calcium ion it is usually necessary to adjust the pH to about 8 or below.

When the reaction is carried out in the broth prior to precipitation of the xanthomonas gum from the broth, glyoxal solution is added to the broth. The mixture is mixed well. Then the precipitating agent is added. The amount of glyoxal added is dependent upon the gum concentration in the broth, the desired amount of glyoxal to react with the gum and the efficiency of the particular equipment used to contact the glyoxal with the gum particles.

As noted above alternate methods of preparation can be carried after the xanthomonas gum is precipitated and dried. The xanthomonas gum can be mulled with a solution of glyoxal. Commercially this particular process can be adapted by using a tumbler or turbulator and spraying a glyoxal solution on to the xanthomonas gum particles. Or the xanthomonas gum may be hydrated in an alcohol water mixture, usually a 1:1 2-propanol:water mixture and glyoxal added thereto.

The complexing of glyoxal with xanthomonas gum results in three effects. First, as little as 0.02% by weight glyoxal based upon the weight of the xanthomonas gum renders the complex dispersible in water or brine by hand stirring. Second, as the amount of glyoxal incorporated into the complex is increased the hydration rate of the complex decreases. This facilitates pumping the material from one site to another site. Third, the xanthomonas gum-glyoxal complex produce higher viscosities in water and brine than does xanthomonas gum alone. The initial viscosities developed by the complexes in water decrease somewhat over a period of hours. The complexes prepared by the method wherein the xanthomonas gum is dispersed in an alcohol-water solution and glyoxal is added, produce higher viscosities than the complexes prepared by the method of mulling or turbolizing the xanthomonas gum while spraying it with glyoxal.

Below are set out specific examples of methods for carrying out the reaction, and comparisons of the hydration rates and viscosities developed by each type of preparation. All of the complexes prepared were dispersible by hand stirring.

PREPARATION OF COMPLEX

EXAMPLE I

Reaction of Xanthomonas Gum and Glyoxal in Fermentation Broth

The xanthomonas gum used as starting material in the preparation of the samples described below was commercially produced according to the preparation set out in the above specification using isopropyl alcohol as the precipitating agent.

To the fermentation broth sample weighing 2000g were added 30g of 40% by weight aqueous glyoxal solution. The broth contained about 2.5% solids which include some proteins and salts as well as the gum. The prepondence of the solids is however gum. The glyoxal addition was about 25% by weight based upon the estimated weight of the xanthomonas gum in the broth. The mixture was mixed well for 1 minute. A 78% by volume 2-propanol reagent was then added in two portions; 700g followed by mixing and then 650g followed by 20 seconds mixing at high shear then four minutes at low shear. The product was then dewatered on a 100 mesh screen and excess liquid was squeezed out. The dewatered product was chopped with 1000g of 78% by volume 2-product reagent at high speed in a blender for one minute. The resulting mixture was centrifuged and dried at a temperature of 80° C in a forced draft oven for a period of 60 minutes. The product was ground and screened through a 60 mesh screen. The final product was dispersed in water and brine by hand mixing. The hydration rate was slow.

EXAMPLE II

Reaction of Xanthomonas Gum and Glyoxal after Precipitation of Gum

The xanthomonas gum used as starting material in the preparation of the samples described below was commercially produced according to the preparation set out in the above specification using isopropyl alcohol as the precipitating agent.

Four hundred grams of fermentation broth was mixed with 400g 78% by volume 2-propanol reagent in two portions interspersed with mixing and followed by 20 seconds of mixing with high shear. Glyoxal was then added in an amount of 0.1% by weight based upon the estimated weight of the gum in the broth. The glyoxal addition was made during a period of four minute mixing at low shear. The 2-propanol, broth and glyoxal mixture was mixed for a total of 10 minutes. The liquid portion was screened off and the excess liquid squeezed out of the precipitate. The product was chopped in 400g of additional 78% by volume 2-propanol reagent at high speed in a blender. The product was then centrifuged, dried for a period of 60 minutes in a forced draft oven at a temperature of 80° C, ground and screened through a 60 mesh screen. The product was found to be readily dispersible with hand mixing.

EXAMPLE III

Reaction of Xanthomonas Gum and Glyoxal after Separation from Broth and Before Drying The xanthomonas gum used as starting material in the preparation of the samples described below was commercially produced according to the preparation set out in the specification using isopropyl alcohol as the precipitating agent.

Four hundred grams of fermentation broth was mixed in a blender with 400g of 78% by volume 2-propanol reagent. The product was screened and excess liquid squeezed out of it. The product was then chopped in a blender operating at high speed with 400g 78% by volume 2-propanol reagent and 0.1% by weight glyoxal based upon the estimated weight of the xanthomonas gum, for a period of 1 minute followed by mixing at low speed for a period of 9 minutes. The mixture was then centrifuged and the residue dried in a forced draft oven for a period of 1 hour at a temperature of 80° C. The product was then ground and screened through a 60 mesh screen. The product was readily dispersible by hand mixing.

EXAMPLE IV

Reaction of Xanthomonas Gum and Glyoxal after Gum Initially Dried.

The xanthomonas gum used as starting material in the preparation of the samples described below was commercially produced according to the preparation set out in the specification using isopropyl alcohol as the precipitating agent.

The samples of the complexes shown below were made by the following procedure. Twenty five grams of xanthomonas gum having a moisture content of about 3% by weight water was weighed and transferred to a mortar. The amounts of commercial 40% by weight glyoxal solution to produce the percentages of glyoxal shown below were weighed out. The weight of the glyoxal solution was brought up to 8 grams by the addition of distilled water. The glyoxal solution is then poured over the xanthomonas gum as evenly as possible. The glyoxal solution is then mulled into the xanthomonas gum with a pestle. Proper mulling required about 10 minutes of hand mixing. The product was then spread in a drying glass and dried at a temperature of 100° C. for a period of about 20 minutes in a forced draft oven. After the first 10 minutes the sample was stirred to insure even drying. The sample was then ground and screened through a 40 mesh screen.

Sample 1 was made as above by using 0.0625g of 40% by volume glyoxal solution and adding 7.94g of distilled water to make up eight grams. The result was 0.1% by weight glyoxal based on the weight of the xanthomonas gum.

Sample 2 was made as above by using 0.03125g of 40% by volume glyoxal solution and adding 7.97g water to make up eight grams. The result was 0.05% by weight glyoxal based on the weight of the xanthomonas gum.

The samples were dispersed in water by hand stirring to prepare aqueous dispersions having a concentration of 0.3% by weight xanthomonas gum-glyoxal complex. The viscosity development in the dispersions was measured using a Brookfield Viscometer Model LV equipped with a No. 2 spindle. The measurements were taken at a temperature of 25° C. +1°. The results are shown below:

| Time from Dispersion | Control 30 rpm | Sample 1 30 rpm | Sample 1 30 rpm | Sample 2 30 rpm | Sample 2 30 rpm |
|---|---|---|---|---|---|
| 5 (min) | | 67 | 109 | 74 | 200 |
| 10 | 270 | | 1470 | | |
| 15 | | 346 | 1700 | 316 | 1620 |
| 30 | | 524 | 2610 | 393 | 1870 |
| 1 (hr) | | 480 | 2420 | 377 | 1800 |
| 2 | | 428 | 2220 | 342 | 1600 |
| 3 | | 390 | 2030 | 302 | 1470 |
| 6 | | 354 | 1820 | 283 | 1350 |
| 72 | | 334 | 1720 | 261 | 1240 |

EXAMPLE V

Viscosity Development of Xanthomonas Gum-Glyoxal Complex Samples in Water

The xanthomonas gum used as starting material in the preparation of the samples described below was commercially produced according to the preparation set out in the specification using isopropyl alcohol as the precipitating agent.

Using the reaction procedure set out in Example IV the following samples of xanthomonas gum-glyoxal complexes containing 0.05% and 0.10% by weight glyoxal based upon the weight of the gum and dried for 20 minutes at temperatures of 100° and 50° C were made. The samples were dispersed by hand stirring in aqueous media. The concentration of the complexes in the aqueous media was 0.3% by weight based upon the weight of the total mixture. Viscosity measurements were made periodically after dispersion using a Brookfield Viscometer Model LV equipped with a No. 2 spindle. The temperature at which the viscosity measurements were made were 25° C +1°. The operating speed of the viscometer and the viscosity measurements are shown below.

| Viscosities (centipoise) | | | |
|---|---|---|---|
| Xanthomonas Gum Control, No Glyoxal Treatment | | | |
| | Time | | |
| RPM | 15 min. | 1 hr. | 24 hr. |
| 30 | 296 | 292 | 296 |
| 3 | 1530 | 1510 | 1530 |

| Sample 1 | | | |
|---|---|---|---|
| 0.1% Glyoxal, 100° C drying temperature, pH 7.5 | | | |
| | Time from Dispensing | | |
| RPM | 15 min. | 1 hr. | 24 hr. |
| 60 | 275 | 203 | 185 |
| 30 | 450 | 330 | 302 |
| 12 | 855 | 600 | 550 |
| 6 | 1440 | 975 | 875 |
| 3 | 2400 | 1450 | 1400 |
| 1.5 | 4120 | 2400 | 2200 |
| .6 | 7900 | 4000 | 3500 |
| .3 | 13,000 | 6000 | 5000 |

| Sample 2 | | | |
|---|---|---|---|
| 0.10% Glyoxal, drying temperature 50° C pH 7.2 | | | |
| | Time from Dispersion | | |
| RPM | 15 min. | 1 hr. | 24 hr. |
| 60 | 235 | 200 | 175 |
| 30 | 385 | 330 | 290 |
| 12 | 688 | 588 | 538 |
| 6 | 1150 | 975 | 850 |
| 3 | 1860 | 1550 | 1300 |

-continued

Viscosities (centipoise)

Xanthomonas Gum Control, No Glyoxal Treatment

| 1.5 | 3000 | 2440 | 2000 |
| .6 | 6350 | 4300 | 3250 |
| .3 | 9200 | 5700 | 4600 |

Sample 3
0.05% Glyoxal, drying temperature 50° C pH 7.6

| | Time from Dispersion | | |
|---|---|---|---|
| RPM | 15 min. | 1 hr. | 24 hr. |
| 60 | 235 | 200 | 175 |
| 30 | 395 | 310 | 275 |
| 12 | 738 | 550 | 500 |
| 6 | 1225 | 900 | 800 |
| 3 | 2000 | 1400 | 1270 |
| 1.5 | 3400 | 2200 | 1900 |
| .6 | 6000 | 3750 | 3100 |
| .3 | 8500 | 5600 | 4500 |

Sample 4
0.1% Glyoxal, drying temperature 100° C pH 7.5

| | Time from Dispersion | | |
|---|---|---|---|
| RPM | 15 min. | 1 hr. | 24 hr. |
| 60 | 278 | 230 | 195 |
| 30 | 450 | 380 | 325 |
| 12 | 875 | 725 | 612 |
| 6 | 1475 | 1200 | 1000 |
| 3 | 2400 | 1940 | 1600 |
| 1.5 | 4000 | 3200 | 2500 |
| .6 | 7500 | 5500 | 4500 |
| .3 | 12,400 | 8400 | 6000 |

EXAMPLE VI

Viscosity Development of Xanthomonas Gum-Glyoxal Complex Samples in Water

The xanthomonas gum used as starting material in the preparation of the samples described below was commercially produced according to the preparation set out in the specification using isopropyl alcohol as the precipitating agent.

Samples of the complexes shown below were made by the following procedure set out in Example III. Twenty five grams of xanthomonas gum having a moisture content of about 3% by weight water were weighted out and slurried with 100g of 50:50 by volume 2-propanol:water. Glyoxal was then added to the samples in amounts to produce complexes containing 0.05% and 1.0% by weight glyoxal based upon the weight of the gum. The samples were then dried for a period of 20 minutes at temperatures of 50° C and 100° C. After drying the dry product was gently broken up. The samples were dispersed by hand stirring in aqueous media. The concentration of the complexes in the aqueous media was 0.3% by weight based upon the weight of the total mixtue. Viscosity measurements were made periodically after dispersion using a Brookfield Viscometer Model LV equipped with a No. 2 spindle. The temperature at which the viscosity measurements were made were 25° C +1°. The operating speed of the viscometer and the viscosity measurements are shown below.

Viscosities (centipoise)

Xanthomonas Gum Control, No Glyoxal Treatment

| | Time | | |
|---|---|---|---|
| RPM | 15 min. | 1 hr. | 24 hr. |
| 30 | 296 | 292 | 296 |
| 3 | 1530 | 1510 | 1530 |

Sample 1
0.1% Glyoxal, drying temperature 100° C pH 8.0

-continued

Viscosities (centipoise)

Xanthomonas Gum Control, No Glyoxal Treatment

| | Time from Dispersion | | |
|---|---|---|---|
| 15 min. | | 1 hr. | 24 hr. |
| 420 | | 258 | 223 |
| 665 | | 430 | 375 |
| 1255 | | 838 | 725 |
| 2150 | | 1400 | 1200 |
| 3600 | | 2250 | 1900 |
| 5600 | | 3500 | 2800 |
| 10,750 | | 6250 | 5000 |

Sample 2
0.05% Glyoxal, drying temperature 100° C. pH 8.0

| | Time from Dispersion | | |
|---|---|---|---|
| 15 min. | | 1 hr. | 24 hr. |
| 268 | | 208 | 205 |
| 450 | | 360 | 340 |
| 900 | | 700 | 675 |
| 1510 | | 1190 | 1120 |
| 2540 | | 1940 | 1851 |
| 4100 | | 3200 | 2900 |
| 8000 | | 5750 | 5250 |
| 12,500 | | 9000 | 8000 |

Sample 3
0.10% Glyoxal, drying temperature 50° C. pH 7.3

| | Time from Dispersion | | |
|---|---|---|---|
| 15 min. | | 1 hr. | 24 hr. |
| 350 | | 255 | 205 |
| 560 | | 425 | 340 |
| 1088 | | 825 | 675 |
| 1900 | | 1450 | 1120 |
| 3120 | | 2300 | 1850 |
| 5000 | | 3600 | 2900 |
| 14,600 | | 7000 | 5250 |
| 15,600 | | 11,200 | 8000 |

Sample 4
0.05% Glyoxal, drying temperature 50° C. pH 8.2

| | Time from Dispersion | | |
|---|---|---|---|
| RPM | 15 min. | 1 hr. | 24 hr. |
| 60 | 230 | 200 | 190 |
| 30 | 390 | 340 | 350 |
| 12 | 775 | 650 | 625 |
| 6 | 1300 | 1100 | 1050 |
| 3 | 2100 | 1750 | 1750 |
| 1.5 | 3400 | 2800 | 2800 |
| .6 | 6500 | 5300 | 5100 |
| .3 | 10,500 | 7600 | 7800 |

EXAMPLE VII

Viscosity Development of Xanthomonas Gum-Glyoxal Complex Samples in Brine

The xanthomonas gum used as starting material in the preparation of the samples described below was commercially produced according to the preparation set out in the specification using isopropyl alcohol as the precipitating agent.

Using the reaction procedure as set out in Example III the following samples of xanthomonas gum-glyoxal complexes containing 0.05% and 0.10% by weight glyoxal based the weight of the gum and dried for 20 minutes at temperatures of 100° C and 60° C were made. The samples were dispersed by hand stirring in 5% by weight sodium chloride media. The concentration of the complexes in the aqueous media was 0.3% by weight based upon the weight of the total mixture. Viscosity measurements were made periodically after dispersion using a Brookfield Viscometer Model LV equipped with a No. 2 spindle. The temperature at which the viscosity measurements were made 25° C +1°. The operating speed of the viscometer and the viscosity measurements are shown below.

| Viscosities (centipoise) | | |
| --- | --- | --- |
| Xanthomonas Gum Control, No Glyoxal Treatment | | |
| Time from | RPM | |
| Dispersion | 30 rpm | 3 rpm |
| 5 (min) | 134 | 390 |
| 7 | 263 | 1020 |
| 8 | 287 | 1200 |
| 10 | 297 | 1230 |
| 12 | 298 | 1260 |
| 13 | 296 | 1260 |
| 15 | 296 | 1260 |
| 2 (hr) | 295 | 1250 |
| 24 | 297 | 1260 |

| Sample 1 | | |
| --- | --- | --- |
| 0.1 % Glyoxal, 100° C drying temperature | | |
| Time from | RPM | |
| Dispersion | 30 rpm | 3 rpm |
| 15 (min) | 345 | 1500 |
| 1 (hr) | 335 | 1500 |
| 24 | 345 | 1600 |

| Sample 2 | | |
| --- | --- | --- |
| 0.1% Glyoxal, 60° C drying temperature | | |
| Time from | RPM | |
| Dispersion | 30 rpm | 3 rpm |
| 15 (min) | 335 | 1500 |
| 1 (hr) | 345 | 1600 |
| 24 | 350 | 1600 |

| Sample 3 | | |
| --- | --- | --- |
| 0.05% Glyoxal, 100° C drying Temperature | | |
| Time from | RPM | |
| Dispersion | 30 rpm | 3 rpm |
| 15 (min) | 330 | 1500 |
| 1 (hr) | 345 | 1560 |
| 24 | 335 | 1640 |

| Sample 4 | | |
| --- | --- | --- |
| 0.05% Glyoxal, 60° C drying temperature | | |
| Time from | RPM | |
| Dispersion | 30 rpm | 3 rpm |
| 15 (min) | 340 | 1540 |
| 1 (hr) | 350 | 1600 |
| 24 | 360 | 1700 |

The embodiments of the present invention in which an exclusive property or privilege is claimed are defined as follows:

1. A hand stirring-dispersible xanthomonas gum-glyoxal complex comprising the reaction product of xanthomonas gum and from about 0.02% to 5% by weight glyoxal based upon the weight of dry xanthomonas gum.

* * * * *

Disclaimer

4,041,234.—*Fred J. Maske,* St. Paul Minn. DISPERSIBLE GLYOXAL-XAN-
THAN GUM COMPLEXES. Patent dated Aug. 9, 1977. Disclaimer
filed Feb. 25, 1985, by the assignee, *Henkel Corp.*

The term of this patent subsequent to Dec. 14, 1993 has been disclaimed.
[*Official Gazette August 13, 1985.*]